United States Patent
Pferschy

(12) 
(10) Patent No.: US 6,710,244 B1
(45) Date of Patent: Mar. 23, 2004

(54) BASE BOARD SYSTEM FOR INSTALLING WIRING AND METHOD THEREFOR

(76) Inventor: James S. Pferschy, 555 E. Silverado Ranch Blvd., #1149, Las Vegas, NV (US) 89123

( * ) Notice: Subject to any disclaimer, the term of this patent is extended or adjusted under 35 U.S.C. 154(b) by 0 days.

(21) Appl. No.: 10/267,418

(22) Filed: Oct. 8, 2002

(51) Int. Cl.[7] ................................................. H02G 3/04

(52) U.S. Cl. ........................ 174/48; 174/68.1; 174/68.3; 174/96; 220/3.2; 52/220.5; 439/207

(58) Field of Search ............................ 174/48, 68.3, 49, 174/50, 68.1, 72 A, 72 R, 72 C, 97, 96; 439/113, 114, 207; 138/111, 166; 52/220.1, 220.3, 220.5, 220.7; 220/3.2

(56) References Cited

U.S. PATENT DOCUMENTS 6,173,536 B1 * 1/2001 Boyce ........................ 52/36.4

* cited by examiner

*Primary Examiner*—Dhiru R Patel
(74) *Attorney, Agent, or Firm*—Jeffrey D. Moy; Harry M. Weiss; Weiss, Moy & Harris, P.C.

(57) ABSTRACT

A system for installing wiring and cable in new and existing buildings has a tray member which will be coupled to a bottom section of a wall and run a length of the wall. A plurality of perforated knock-outs are located in an interior section of the tray member. A plurality of retaining clips are coupled to the interior section of the tray member. At least one electrical box is coupled to the tray member. An electrical accessory is coupled to the electrical box. A cover is coupled to the tray member for covering the wiring and the cables in the system. A face plate is coupled to the electrical box which mounts flush to and matches the cover.

11 Claims, 2 Drawing Sheets

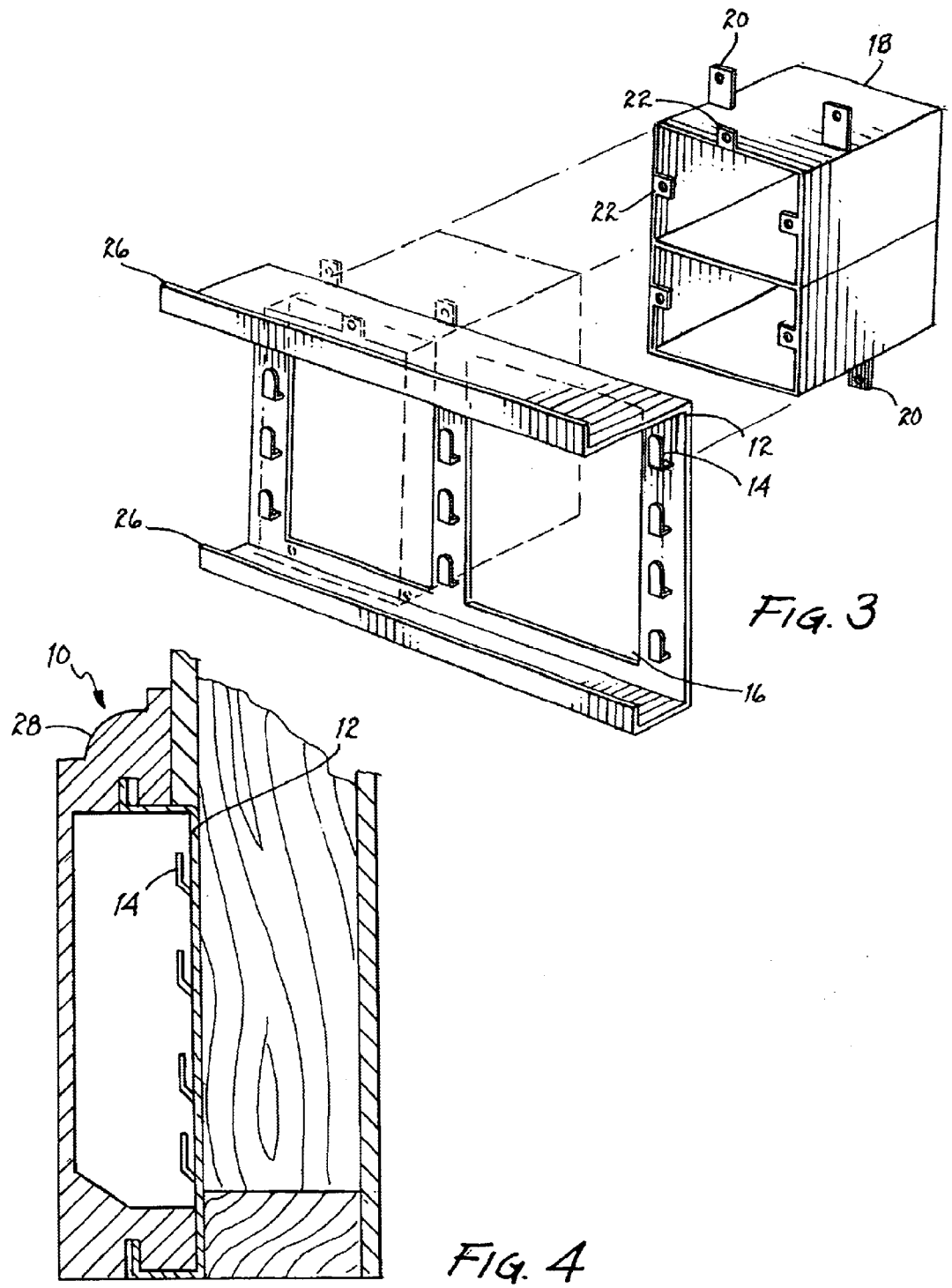

BASE BOARD SYSTEM FOR INSTALLING WIRING AND METHOD THEREFOR

BACKGROUND OF THE INVENTION

1. Field of the Invention

This invention relates generally to wiring systems and, more specifically, to a base board system which will allow one to install wiring, cable, etc. around a home or office building with out the need to run the wiring through the walls.

2. Description of the Prior Art

In a home or office building, electrical wiring and cabling is usually placed inside the walls of the structure. The wiring is placed inside the walls during the construction process and run to a plurality of different electrical boxes such as an outlet box, a cable box, phone jacks, etc.

A problem often arises when additional electrical boxes need to be installed in the structure after all of the walls have been built. When this occurs, one of two things can be done. First, the drywall, paneling, etc of the wall can be removed or broken so that additional wiring can be installed within the wall. Alternatively, one may go to the attic of the building and try and run the wiring through the walls. Both of the above methods are very time consuming and expensive undertakings.

Another problem with current wiring systems and methods occur when there is a wiring failure in the building. Many times when a short or other wire failing occurs, it is difficult for one to locate the problem area. Many times, electricians must remove the drywall or paneling in order to expose the wiring to see where the problem has occurred. Once again, this is a very expensive and time consuming process.

Therefore, a need existed to provide an improved system and method for wiring houses and building. The improved system and method for wiring houses and buildings will allow one to easily install wiring without the need to remove the drywall or wall paneling. The improved system and method for wiring houses and buildings must further allow one to easily locate wire failing areas without the need to remove the drywall or wall paneling.

SUMMARY OF THE INVENTION

In accordance with one embodiment of the present invention, it is an object of the present invention to provide an improved system and method for wiring houses and building.

It is another object of the present invention to provide an improved system and method for wiring houses and buildings which will allow one to easily install wiring without the need to remove the drywall or wall paneling.

It is still another object of the present invention to provide an improved system and method for wiring houses and buildings that allows one to easily locate wire failing areas without the need to remove the drywall or wall paneling.

BRIEF DESCRIPTION OF THE EMBODIMENTS

In accordance with one embodiment of the present invention, a system for installing wiring and cable in new and existing buildings is disclosed. The system has a tray member which will be coupled to a bottom section of a wall and run a length of the wall. A plurality of perforated knock-outs are located in an interior section of the tray member. A plurality of retaining clips are also coupled to the interior section of the tray member. A cover is coupled to the tray member for covering the wiring and the cables in the system.

In accordance with another embodiment of the present invention, a system for installing wiring and cable in new and existing buildings is disclosed. The system has a tray member which will be coupled to a bottom section of a wall and run a length of the wall. A plurality of perforated knock-outs are located in an interior section of the tray member. A plurality of retaining clips are coupled to the interior section of the tray member. At least one electrical box is coupled to the tray member. An electrical accessory is coupled to the electrical box. A cover is coupled to the tray member for covering the wiring and the cables in the system. A face plate is coupled to the electrical box which mounts flush to and matches the cover.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

FIG. 3 is an exploded view of the wiring system of the present invention with the cover and face plate removed.

FIG. 4 is a side view of the wiring system of the present invention with the electrical box removed.

DETAILED DESCRIPTION OF THE PREFERRED EMBODIMENT

Figure 1:
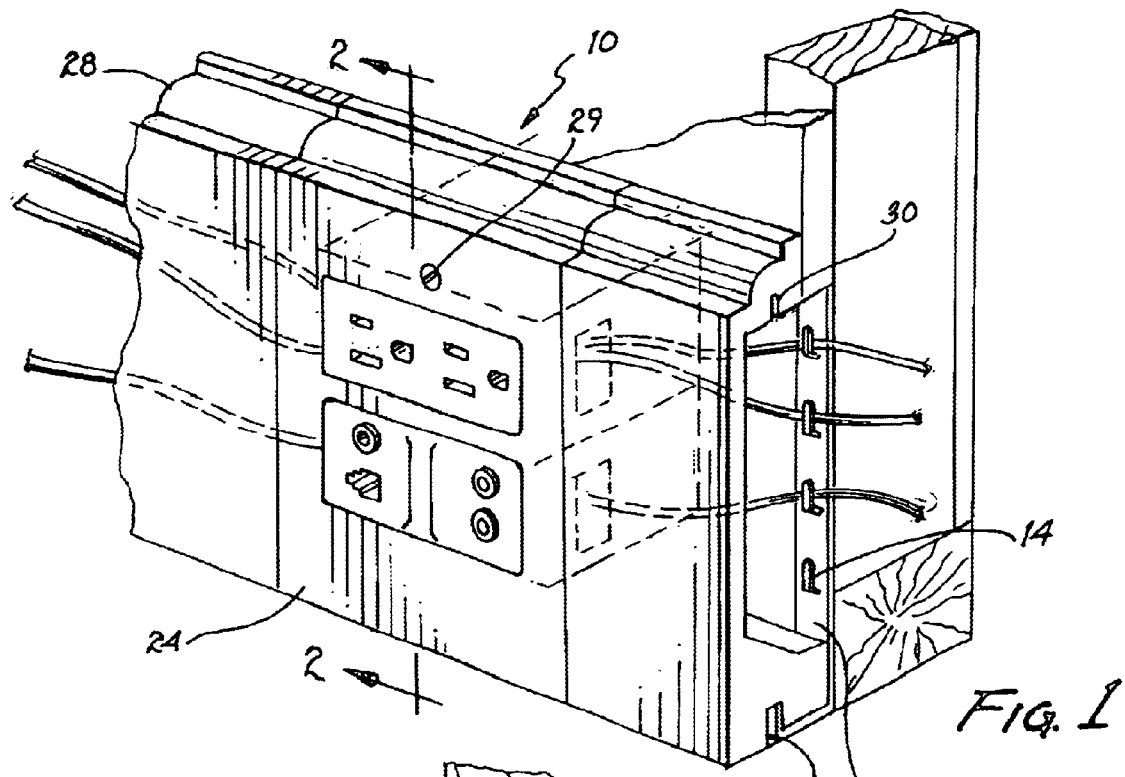
FIG. 1 is an elevated perspective view of the wiring system of the present invention.
Figure 2:
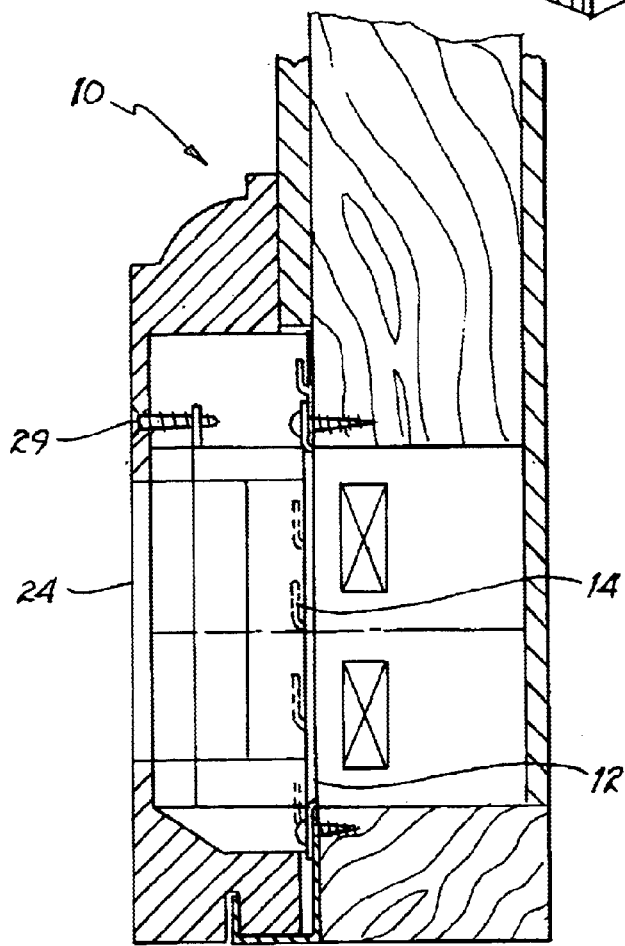
FIG. 2 is a side view of the wiring system of the present invention showing an electrical box.

Referring to FIGS. 1–4 wherein like numerals and symbols represent like elements an electrical wiring system 10 (hereinafter system 10) is shown. The system 10 will allow one to easily install wiring in a new or existing building without the need to remove drywall or paneling. The system 10 will further allow one to easily fix wiring problems without the need to remove drywall or paneling. The system 10 is a base board molding system which will replace existing base boards or which may be installed as a new base board in a home or office. The system 10 will allow the wiring to run within the baseboard molding. Thus, one can easily install new wiring without the problems associated with the prior art.

The system 10 has a tray member 12. The tray member 12 will be positioned at the bottom of a wall and close to or on the ground/floor. In general, the tray will be slightly recessed into the wall. This will allow the system 10 to be more flush with the wall to provide a more aesthetic look. However, this should not be seen as to limit the scope of the present invention. The tray 12 is similar in shape to a "U". However, this also should not be seen as to limit the scope of the present invention. In the interior of the tray member 12 are a plurality of retaining clips 14. The retaining clips 14 are used for holding and organizing the wires, cables, etc. which will be stored within the system 10. In accordance to one embodiment of the present invention, a plurality of different sets of retaining clips 14 are used. Each set will have a plurality of retain clips 14 aligned in a horizontal fashion. The sets of retaining clips 14 will be spaced apart and run the entire length of the tray member 12.

Also located in the interior section of the tray member 12 are a plurality of perforated knock-outs 16. Each knock-out 16 is used to position and hold an electrical box 18. If an electrical box 18 is required, one would remove the knock-out 16 along the perforations and install an electrical box 18. If an electrical box 18 is not required where there is a perforated knock-out 16, then the knock-out 16 is not removed.

The electrical box 18 will have a plurality of tabs 20. The tabs 20 are located along a top surface and a bottom surface of the electrical box 18. The tabs 20 are used to secure and lock in the electrical box 18 within the knock-out 16. The electrical box 18 also has a plurality of screw tabs 22. The screw tabs 22 are used for two main purposes. Some of the screw tabs 22 are used to secure electrical plugs, cable connectors, speaker outlets/jacks, phone jacks, etc. to the electrical box 18. As may be seen more clearly in FIG. 1, each electrical box 18 will generally house one or more of the above mentioned electrical accessories. The other screw tab 22 is used to secure a face plate 24 to the electrical box 18.

The tray member 12 will have a lip member 26 which will extend from the edges of the "U" shaped tray member 12. The lip member 26 is used to secure a cover 28 over the tray member 12. The cover 28 will have a pair of channels 30A which will run the length of the cover 28. The lip member 26 will be inserted into the channels 30A in order to secure the cover 28 to the tray member 12. When in place, the cover 28 will hide the wiring which is placed within the tray member 12. The cover 28 will be similar in look to a baseboard, thus giving the system 10 a more aesthetic look and feel. The cover 28 will have openings where the electrical boxes 18 are located. Face plates 24 are then used which will be mounted flush with the cover 28 and made of the same material to match the cover 28.

As stated above, the face plates 24 have the same look as the cover 28. The face plates 24 are flush mounted with the cover 28. The face plates 24 may be secured to the electrical box 18 in a similar manner as the cover 28. The face plates 24 may have channels 30B which engage the lip member 26 of the tray member 12. Alternatively, a mounting screw 29 may be used to secure the face plate 24 to the electrical box 18.

The system 10 will allow one to easily install and hide wiring in a new or existing home or building. The system 10 will further allow one to easily check and correct wiring or cable problems with the system 10. By simply removing the cover 28, one may install new wiring or cable within the building and inspect current wiring and cable for problems. The entire system 10 is recessed within the wall to provide a nice and aesthetically pleasing base board look.

Installation

When installing the system 10, one will remove the perforated knock-outs 16 from the tray member 12 where an electrical box 18 is to be installed. The electrical box 18 is then snapped and locked within the opening formed by the removal of the perforated knock-out 16. The tray member 12 is then placed on a bottom section of a wall near the floor of the building. Electrical accessories are installed in the electrical box 18. Wiring is run within the tray member 12 and coupled to the electrical accessories. The wiring is organized and held within the retaining clips 14 within the tray member 12. The cover 28 is then secured to the tray member 12. The face plates 24 are then secured to the electrical boxes 18.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for installing wiring and cable in new and existing buildings comprising, in combination:
    a "U" shaped tray member which will be flushed mounted to a front bottom section of a wall and run a length of the wall;
    a plurality of perforated knock-outs located in an interior section of the tray member for recessed mounting at least one electrical box while allowing the system to be flush mounted to the front bottom section of the wall when at least one of the perforated knock-outs is removed;
    a plurality of retaining clips coupled to the interior section of the tray member;
    a cover coupled to the tray member for covering the wiring and the cables in the system;
    wherein the tray has a pair of lip members extending from the edges for coupling the cover to the tray member.

2. A system for installing wiring and cable in new and existing buildings in accordance with claim 1 further comprising:
    an electrical accessory coupled to the electrical box; and
    a face plate coupled to the electrical box.

3. A system for installing wiring and cable in new and existing buildings in accordance with claim 2 wherein the face plate is flush mounted to and matches the cover.

4. A system for installing wiring and cable in new and existing buildings in accordance with claim 1 wherein the electrical box has a plurality of locking tabs for coupling the electrical box to the opening formed in the tray member by removing one of the plurality of perforated knock-outs.

5. A system for installing wiring and cable in new and existing buildings in accordance with claim 1 wherein the cover has a pair of channels which run a length of the cover for engaging the pair of lip members and securing the cover to the tray member.

6. A system for installing wiring and cable in new and existing buildings comprising, in combination:
    a "U" shared tray member which will be flush mounted to a front bottom section of a wall and run a length of the wall;
    a plurality of perforated knock-outs located in an interior section of the tray member for recessed mounting at least one electrical box while allowing the system to be flush mounted to the front bottom section of the wall when at least one of the perforated knock-outs is removed;
    a plurality of retaining clips coupled to the interior section of the tray member;
    an electrical accessory coupled to the electrical box;
    a cover coupled to the tray member for covering the wiring and the cables in the system; and
    a face plate coupled to the electrical box which mounts flush to and matches the cover;
    wherein the tray has a pair of lip members extending from the edges for coupling the cover to the tray member.

7. A system for installing wiring and cable in new and existing buildings in accordance with claim 6 wherein the electrical box has a plurality of locking tabs for coupling the electrical box to the opening formed in the tray member by removing one of the plurality of perforated knock-outs.

8. A system for installing wiring and cable in new and existing buildings in accordance with claim 6 wherein the cover has a pair of channels which run a length of the cover for engaging the pair of lip members and securing the cover to the tray member.

9. A system for installing wiring and cable in new and existing buildings comprising, in combination:
- a baseboard looking molding having a hollow interior section flush to a front bottom section of a wall wherein the hollow interior section is used to house wiring wherein the baseboard looking molding comprises:
    - a "U" shaped tray member which will be coupled to a bottom section of a wall and run a length of the wall;
    - a plurality of perforated knock-outs located in an interior section of the tray member for holding electrical boxes;
    - a plurality of retaining clips coupled to the interior section of the tray member for holding the wiring; and
    - a cover coupled to the tray member for covering the wiring and the cables in the system;
    - wherein the tray has a pair of lip members extending from the edges for coupling the cover to the tray member;
- electrical boxes coupled to the baseboard looking molding and the wiring; and
- face plates coupled to the electrical boxes wherein the face plates are flush mounted to the baseboard looking molding.

10. A system for installing wiring and cable in new and existing buildings in accordance with claim 9 wherein the electrical box has a plurality of locking tabs for coupling the electrical box to the opening formed in the tray member by removing one of the plurality of perforated knock-outs.

11. A system for installing wiring and cable in new and existing buildings in accordance with claim 9 wherein the cover has a pair of channels which run a length of the cover for engaging the pair of lip members and securing the cover to the tray member.

* * * * *